United States Patent
Mencke

(10) Patent No.: US 6,188,828 B1
(45) Date of Patent: Feb. 13, 2001

(54) FILLING MATERIAL

(75) Inventor: Markus Mencke, Deutsch Evern (DE)

(73) Assignee: MWO Gesellschaft zur Herstellung von chemisch-technischen Produkten mbH, Brahlstorf (DE)

(*) Notice: Under 35 U.S.C. 154(b), the term of this patent shall be extended for 0 days.

(21) Appl. No.: 09/355,672

(22) PCT Filed: Feb. 6, 1998

(86) PCT No.: PCT/DE98/00353

§ 371 Date: Jul. 30, 1999

§ 102(e) Date: Jul. 30, 1999

(87) PCT Pub. No.: WO98/34983

PCT Pub. Date: Aug. 13, 1998

(30) Foreign Application Priority Data

Feb. 6, 1997 (DE) .............................................. 197 04 398

(51) Int. Cl.⁷ ........................................................ G02B 6/00
(52) U.S. Cl. ........................... 385/141; 385/147; 523/116
(58) Field of Search .................................... 385/100, 147, 385/141; 106/287.1; 427/128, 328, 329; 560/149; 523/116, 173; 424/9.52; 428/323

(56) References Cited

U.S. PATENT DOCUMENTS

| | | | |
|---|---|---|---|
| 4,705,571 | | 11/1987 | Lange et al. ...................... 106/287.1 |
| 4,759,979 | * | 7/1988 | Kosha et al. ......................... 427/128 |
| 4,839,970 | | 6/1989 | Goetze et al. ..................... 350/96.23 |
| 5,558,853 | * | 9/1996 | Quay ................................... 424/9.51 |
| 5,558,855 | * | 9/1996 | Quay ................................... 424/9.51 |
| 5,595,723 | * | 1/1997 | Quay ................................... 424/9.51 |
| 5,616,782 | * | 4/1997 | Thompson et al. .................... 424/56 |
| 5,707,606 | * | 1/1998 | Quay ................................... 600/458 |
| 5,707,607 | * | 1/1998 | Quay ................................... 600/458 |
| 5,814,682 | * | 9/1998 | Rusian et al. ........................ 523/116 |
| 5,876,696 | * | 3/1999 | Quay ................................... 424/9.52 |

FOREIGN PATENT DOCUMENTS

| | | | |
|---|---|---|---|
| 0732374 | 9/1996 | (EP) | ............................... C08L/91/00 |
| 9200368 | 1/1992 | (WO) | .......................... C10M/107/00 |
| 9703117 | 1/1997 | (WO) | ............................... C08K/5/11 |

* cited by examiner

Primary Examiner—Akm E. Ullah
(74) Attorney, Agent, or Firm—Hedman & Costigan, P.C.

(57) ABSTRACT

Filling materials are prepared which contain polyoxyalkylenes and surfactants. These filling materials are particularly well-suited for optical waveguides of which the cable and/or core sheaths consist essentially of polyolefin plastics.

14 Claims, No Drawings

FILLING MATERIAL

The invention relates to a filling material, in particular for optical waveguide cables, which contains polyoxyalkylenes as basic fluids, and the use of such filling materials in electrical and optical devices.

Optical waveguides are used for the conducting of optical signals, and for this purpose are laid in the form of optical waveguide cables. Optical waveguide cables feature in general the following composition ("loose tube" design): A cable sheathing as an outer delimitation surrounds one or more cores. Located in the cores are one or more optical waveguides. Both the interior of the cores and the inside space of the cable sheath is filled with a filling material. Gel-like filling materials are used for preference in the cores. The intermediate space between the individual cores and the cable sheathing as the outer delimitation may likewise be filled out with a gel-like substance. For economic reasons, the filler material is in this situation mostly a more economically-priced material, such as a wax. The optical waveguide itself consists mostly of silicon dioxide, but may also consist of polyolefins, fluorinated hydrocarbons, or other plastics, or contain these. Mention may be made at this point of polycycloolefins (in particular, copolymerisates and terpolymerisates of cycloolefins with short-chain olefins), which in turn may be coated with other plastics. There are also other cable designs in existence, such as "slotted core" cables, in which the optical fibres are located in slots around a circular core, in which situation the slots are filled with a gel-like substance, or "ribbon" cables, in which the fibres rest on broad ribbon strips, several of which are in turn are combined to form a block.

Nowadays, in loose-tube designs the cores of the cables are usually filled with a gel-like substance, in order to protect the optical waveguides (the equivalent of optical fibres) against gross mechanical or chemical effects, such as the influence of moisture. In other cable designs, too, gel-like filling materials are used, such as, for example, with "slotted core" cables or "ribbon" cables. The consistency of the filling materials is to be adjusted in such a way that with the fibre(s) in the state of rest a specific retention capacity will be achieved. The gel-like substance under load produces, under load, a threshold value, in order to protect the optical waveguides against transverse forces (structural viscosity with flow limit). The filler material is intended in this situation to occupy at all times the space available in the cores. At the same time, reciprocal effects of the filling material with the core(s), threw cable sheathing, or the optical waveguide or its coating, must be avoided as far as possible. In addition to this, the filling materials are also intended to be sufficiently proof against dripping out, especially under high temperatures, and must not become too rigid at low temperatures.

Usually, the gel-like substance is based on a mineral and/or synthetic oil, which is thickened with a thixotropicalisation medium (such as colloidal silicic acid); if appropriate, however, other hydrocarbon polymers can also be added, in most cases caoutchouc rubbers such as SEBS, SIS, SI, and SB (S=styrene, I=isoprene, E=ethylene, B=butadiene), in order to reduce the leaching of oil, and an anti-oxidation agent.

From the patent literature, a plurality of different compounds are known as the base fluid of the filing compounds, such as, for example, mineral/synthetic oils, silicone compounds, weakly-crosslinked hydrocarbon oils, polyolefins, EP-caoutchouc rubbers (E=ethylene, P=propylene) and halongenised biphenyls.

The German Patent Specification DE-A1-36 22 211, or its U.S. subsequent application U.S. Pat. No. 4,839,970, describe a filling material for optical waveguide cores and/or optical waveguide cables, which contain 50 to 99% by weight polypropylene glycol, to which are added, as thixotropicalisation agents, between 50 and 1% by weight highly-dispersed silicon dioxide, aluminium dioxide, aluminium hydroxide, and/or an organic compound containing halogen. The polypropylene glycol has, for preference, a molecular weight from 2000 to 3500 g/mol. If the filling material is used in the optical waveguide cores, the polypropylene glycol is contained in the compound in the proportion of 99 to 96% by weight, and the thixotropicalisation agent in the proportion of 1 to 4% by weight. As a filling material for the optical waveguides, a compound is recommended of 92 to 50% by weight polypropylene glycol and 8 to 50% by weight thixotropicalisation agent. This filling material does not attack polyurethane acrylate as a fibre coating material.

The material from which the cores are extruded during manufacture consists mostly of polyester, polybutyl enterphthalate, or a comparable plastic, which at least in part consists of polar groups. Because this type of plastic is relatively expensive, it is recommended from the financial point of view that a change be made to more economical olefinic polymers, such as LD polyethylene, HD polyethylene, or polypropylenes. Almost all the filling materials on the market are based, however, on a mineral and/or synthetic oil, which impairs the mechanical properties of the olefinic plastics which come in contact with it, because the oil migrates into these plastics and so changes their properties. Thus, for example, the migration of the oil reduces the tensile strength significantly. In order to be able to use the more economical olefinic substances as core materials, new migration-free core filling materials are required.

The objective of the invention is to provide such a filling material for optical waveguide cables which feature a suitably low migration for core materials and/or cable sheathings and/or cable coatings made of olefinic polymers, and, at the same time, are sufficiently non-polar to take effect as a moisture block.

In addition to this, the filling material must be resistant to ageing both chemically and physically, and must as far as possible retain its properties over a wide temperature range (−60° C. to +80° C.) both in respect of its Theological behaviour as well as in respect of its chemical compatibility with the other active substances of the optical waveguide cable. It should effectively be able to absorb tensile and pressure forces, and keep them from the optical waveguides, as well as, right from the outset, have no inclination to the absorption of water. Likewise, the compound must be easy to process when filling the cables and cores, and must not, even after long use or under the influence of increased or reduced temperature, lead to the separation of the phases, base fluid, or colloidal particles. In addition to this, hydrogen and water must be effectively kept away from the optical waveguide.

A filling material for optical waveguide cables which fulfils these objectives is the object of the invention according to claim 1. This consists of a compound which contains, as the base fluid, one or more polyoxyalkylenes, of which the alkylene units in each case feature 2 to 5, for preference 2 to 3, carbon atoms, and which, related to the alkylene unit, features in each case 2 to 4, for preference 2 to 3, ether compounds, and as colloidal particles contains oxides and/or hydroxides of silicon and/or aluminium, as well as at least one surfactant.

In particular, the polyoxyalkylenes contained in the filling materials according to the invention have the general structural formula:

A-[O-X]$_n$-Z, where

A and Z are end groups, which are usually hydrogen, hydroxy, or C1 to C5 alkyl groups, in which situation A is for preference an alkyl group and Z a hydroxy group;

X is a non-branched or branched saturated alkylene group with 2 to 4 carbon atoms, for preference 2 or 3, such as, for example, ethylidene —CH$_2$—CH$_2$— or 1,2-propylidene —CH$_2$—CH(CH3)— or 1,3-butylidene —CH$_2$—CH$_2$(CH$_3$)—CH$_2$—, in which case X can be different for each n, and n is a whole number such that the mean molecular weight of the polymers is 200 to 5000 g/mol.

The polyoxyalkylenes according to the invention feature a molecular weight from 200 to 5000 g/mol, for preference 200 to 2000 g/mol, and, in particular, for preference from 300 to 1800 g/mol. Polyoxyalkylenes are also designated as polyethers. The class of polyoxyalkylenes also includes polypropylene glycol and polyethylene glycol. The polyoxyalkylenes should feature a water content of <0.2% by weight (after Karl Fischer). Examples of these which may be mentioned are the products PE 8901 from Goldschmidt AG and Acclaim 2200 from Arco Chemical.

As colloidal particles (thixctropicalisation media), use is made of highly dispersed silicic acid, which may, if appropriate, contain additives of Al$_2$O$_2$, in which situation the silicic acid may, if appropriate, be rendered hydrophobic (coated) in whole or in part. The BET surface of the colloid particles can be from 50–500 m$^2$/g. The mean particle size of the colloid particles should be smaller than 50 nm, related to the mean size of the primary particles, or less than 50 μm related to the mean size of the agglomerates. For example, the commercial products Aerosil® 202 (Degussa AG) and CaB—O— Sil® TS 610 (Cabot GmbH) may be mentioned. In addition to this, silicates, bentonites, montmorillonite, or mixtures thereof are also suitable as colloidal particles.

In addition, surfactants are used, which as additives modify the Theological effect of the colloidal particles to advantage, and at the same time hold them in the "dispersed" state.

The surfactants in the meaning of the invention are limit-surface active substances. They are provided with a hydrophobic hydrocarbon residue and one or possibly more hydrophillic functional groups. The hydrophillic portions of the molecule involve polar function groups (e.g. —COO—, —CONH—, —OSO$_3$—, —SO$_3$—), while the hydrophobic portions represent non-polar hydrocarbon residues.

The object of the limit-surface active substances (surfactants) used according to the invention are:

(A) Anionic and cationic surfactants.

Anion surfactants (anionic surfactants) feature one or more functional anion-active groups, which disassociate in an aqueous solution, with the formation of anions. Examples of typical anionic groups are —COOH, —COONa, —SO$_3$Na and —OSO$_3$Na.

Particularly well-suited are polyhydroxy carboxylic acids, in particular oligomers or polymer polyhydroxy carboxylic acids and their salts.

Cation surfactant is a collective designation for cation-active surfactants, i.e. limit-surface active substances which feature the high-molecular or oligomer hydrophobic organic residues which determine the surface activity, and which are present as cations at the disassociation in the aqueous solution. Cation surfactants are, for example, the quaternary ammonium compounds of the general formula: (R$_4$N+)X−.

Mention may be made of cation surfactants, in which the nitrogen group is substituted with two long and two short alkyl residues, e.g. dimethyl distearylammonium chloride.

For preference, alkyl ammonium salts, in particular oligomer or polymer, such as, for example, alkyl ammonium salts of polymer carboxylic acids or their derivatives. The quantity of the surfactant amounts for preference to 10 to 50% of the proportion of the colloid particles (related to the weight). The addition of the surfactant allows to advantage the use of low-molecular polyoxyalkylenes. This leads to excellent low-temperature behaviour of the filling materials according to the invention. In addition to this, the dissolution behaviour of the filling materials is reduced by the addition of the surfactant.

Mention may be made, by way of example of suitable surfactants, which can also be used as solids: Solution of a low-molecular non-saturated acid polycarboxylic acid polyester Tracodis 200; solution of a polyhydroxycarboxylic acid amide Tracodis 405.

Surface-limit active substances (surfactants) used as the object according to the invention are, further:

(B) Polyols, which feature at least 3 hydroxy groups (including the etherised and esterised hydroxy groups), for preference at least 4 and, for especial preference 5 to 30 hydroxy groups, in which situation the hydroxy groups are in part or in while, for preference in part, etherised or esterised, so that the polyol, in addition to the non-etherised or non-esterised (free) hydroxy groups, features at least one ether group (C—O—C (=O)—C group) per molecule. In addition to this, it is preferred for the polyol compound to feature at least two free hydroxy groups (—OH).

By way of example, let the polyols according to (B) be explained by the following compounds/compound classes, in which situation the object of the invention is represented by only such compounds as also fall under the definition according to (B):

Oxalkylated polyhydroxy alcohols,

Oxalkylated poly carboxylic acids, and

Derivatives of polyhydroxy carboxylic acids such as oxyalkylated hydroxycarboxylic acids, and oxalkylated carboxylic acid esters.

Particular preference is given to:

Esters of a mon-carboxylic acid or di-carboxylic acid, with a polyalcohol, in which situation the acid group of the ester consists for preference of long-chain carboxylic acids with at least 6, and for particular preference, at least 12, hydrogen atoms, and the ester compound is, for particular preference, oxalkylised, e.g. oxethylised. These are, for example, sorbitan esters and oxalyklised derivatives of a sorbitan ester (in particular, the commercial products Tween® and Span®) and sucrates (fatty acids of saccharose) and their polyoxalkylised derivatives.

Alkyl/alkylene glycosides derived from fatty alcohols and from (for preference, ring-form) sugar molecules with, in particular, glucose and/or maltose units, if applicable with glycoside bonding, and which feature a mean molecular weight of 250 to 1000 g/mol. The fatty alcohol features for preference 6 to 22 hydrogen atoms. The alkyl/alkenyl glycosides may be oligomeric, in which case the glycoside proportion consists on average of one to three, for preference one to two, glycoside units. The alkylene glycosides may feature one or two double bonds. Alkyl glycosides are, for example, the commercial products Plantacare® from Henkel KGaA.

The term oxalkylised compounds in the meaning of the invention is understood to mean compounds such as are obtained from the conversion of compounds containing acidic hydrogen, such as carboxylic acids or alcohols with C2- to C4 oxirans. If ethylene oxide is used, this is referred to as ethoxylisation or oxyethylisation.

Microspheres as optional components of the filling material serve to change the density and the relative dielectric constants of the filling materials. They are thermoplastic hollow spheres, filled with propellant gases. A commercial product is Expancel® DE 551, from the company of Expancel/AKZO. As anti-oxidation agents, use can be made, for example, of steric inhibited hydrochinones or phenols. Commercial products are, for example, Irganox® 1010 (pentaerythriyl-tetrakis[3-(3,5-di.-tert. butyl-4-hydroxy-phenyl) propionate]), Irganox 1076 (benzolpropionic acid-3,5-bis(1,1 dimethylethyl)-4-hydroxy-octadecylester) or Naftonox® BHT.

Further optional components of the filling material are mineral oils and/or synthetic hydrocarbon oils. The synthetic oils are, for example, polyalkenes, of which the monomer units consist of 5 to 14 hydrocarbon atoms, in which situation these are, for preference, alk-1-enes. These compounds are also designated as PAIO's. These feature for preference a kinematic viscosity of 2 to 14 mm$^2$/s (at 100° C., measured in accordance with ASTM D445).

Possible compositions according to the invention of the filling material are shown in Table 1. The percentages by weight (% by weight) details are in each case independent of one another.

TABLE 1

Compositions according to the invention of the filling material

| Proportions (% by weight) | For preference* (% by weight) | Components |
|---|---|---|
| 50–99 | 99–75 | Polyoxyalkylene |
| 1–10 | 2–6 | Colloidal particles |
| 0.1–10 | 0.2–5 | Surfactant |
| 0–5 | 0.5–2.5 | Microspheres (hollow spheres) |
| 0–5 | 0.2–2.5 | Anti-oxidation agents |

The manufacture of the filling materials according to the invention can be carried out in accordance with the following procedure:

1. Presentation of the fluid components (polyoxyalkylenes),
2. Possible addition and dissolution of the anti-oxidation agent,
3. Addition and careful stirring in of the colloidal particles into the fluid component(s),
4. Dispersion of the colloidal particles with a mixer,
5. If microspheres are added, stir them in,
6. Addition and distribution of the surfactant, in which situation the viscosity desired in accordingly attained,
7. Removal of air bubbles by imposition of a vacuum.

Colouring agents may be added to the filling material. The migration resistance is determined with the individual filling materials to a large extent by the choice of the base fluid, and is also dependent on the temperature and time.

Objects of the invention are likewise electrical or optical devices with a sheath/housing, such as cables, cores, strips, plugs, or sleeves, containing at least one optical waveguide located in the interior of the device, in which situation the housing/sheath or the surface thereof consists essentially of hydrocarbon polymers, and the sheath/housing is filled in the interior with a filling material according to the invention.

The filling materials according to the invention are used in electrical or optical devices with a sheath/housing, such as cables, cores, strips, plugs, or sleeved, in which situation the devices contain at least one optical waveguide. To advantage, they are used in situations in which the surface of at least one of the devices, with which the filling material comes in contact, consists essentially of hydrocarbon polymers. Hydrocarbon polymers in the meaning of the invention are polymers which consist of more than 95% by atomic content, and for preference greater than 98% by atomic content, of hydrogen and/or carbon atoms. Typical representatives of this class are the poly-α-olefins.

EXPERIMENTAL SECTION

For the manufacture of the example formulations 1 to 3, according to the outline given above, the following polyoxyalkylenes are used:

TABLE 2

| Polyoxyalkylenes | | | |
|---|---|---|---|
| | Type | [g/mol] | Manufacturer |
| POA 1 Polyoxypropylene | BP18100 | 1500–2000 | Goldschmidt AG |
| POA 2 Polyoxypropylene | BP 8901 | 300–500 | Goldschmidt AG |

The filling materials 1 to 3 contain, specifically, the following components, in which the figure values are percentages by weight:

TABLE 3

| | Formulations | | | |
|---|---|---|---|---|
| | | Example 1 | Example 2 | Example 3 |
| POA 1 | | — | 93.4 | 93.9 |
| POA 2 | | 94.4 | — | — |
| Aerosil R 202 | (Silicic acid) | — | 3 | — |
| Cab-O-Sil M 5 | (Silicic acid) | 5 | 3 | 5 |
| Tracodis 200 | (Surfactant) | 0.5 | 0.5 | — |
| Expancel DE 551 | (Microspheres) | — | — | 1 |
| Naftonox BHT | (Anti-oxidation agent) | 0.1 | 0.1 | 0.1 |

Hereinafter it is intended that in general consideration will be given of the important values of the optical waveguide filling materials according to the invention, which are of significance for the properties of the filling materials beyond the example given. The general considerations are supplemented by specific measured values of the example formulations.

Rheology

The filling materials according to the invention feature structural viscosity with a flow limit or yield point. The viscosity required can be adjusted almost at will with the aid of the silicic acid and the surfactant. It is practically impossible to detect an elastic proportion. The viscosity behaviour was determined with a Physica MC 100 rheometer and a measuring system according to DIN 53019.

Hardness

The measurement for this is the cone penetration according to DIN ISO 2137. With this, the behaviour of the compound is usually described at low temperatures (penetration depth of a cone into the compound).

TABLE 4

Cone penetration at different temperatures on the basis of Example 1

| Temperature in ° C. | Cone penetration in mm/10 |
|---|---|
| −40 | 250 |
| −25 | 270 |
| 0 | 300 |
| +25 | 320 |

Oil Leaching Behaviour (method: FTM 791 C)

For this purpose a screening test is usually carried out, in which a specific volume of the filler is filled into a spherical screen (60 mesh). The spherical screen was conditioned for 24 hours in a glass beaker at a specific temperature. The volume which drips from the screen into the beaker is then added to the weighed volume in the correct proportion. According to the specification provided for in Germany, the compounds should leach a maximum of 9% over a 24 hour period at 60° C.

TABLE 5

Leaching behaviour of the formulations

| Compound | Leaching 24 h/60° C. |
|---|---|
| Example 1 | 0% |
| Example 2 | 1% |
| Example 3 | 0% |
| Example 1 (without surfactant) | 6% |

Migration

There is no generally standardised measuring method for determining the migration. The following method was applied in this case:

Small rods (L 50 mm, B 10 mm, D 1 mm) were stamped out of extruded HDPE or PP sheets (or another material to be determined).

A rod was conditioned for a specific period at a specific temperature in the filling material or in the basic oil for 7 days at 60° C. or at 70° C. or at 85° C.

The weight of the rod was then compared with the weight before conditioning, and the weight increase due to oil calculated from this.

TABLE 6

Migration determined over 7 days at 60° C.

| Basic oil | Migration into HDPE | PP |
|---|---|---|
| POA 1 | <0.1% | <0.1% |
| POA 2 | 0.5% | 2% |
| PAO 6 | 1.2% | 4% |
| PAO 10 | 1.0% | 3% |
| Mineral oil | 2.0% | 4.5% |

In order to be able to compare the specific values, the temperature and the time must always be indicated. Values for different materials can only be compared under identical test conditions (such as the same time span, same temperature). To provide a comparison, only a few values of basic oils of conventional weights are listed in comparison to the invention. During the migration, and depending on the temperature, saturation is reached after a specific time. The migration values are, down to slight deviations, dependent on whether they are determined in the basic oil or the filling material manufactured from this, or they correlate directly.

Flash Point (method: DIN ISO 2592)

From the point of view of safety in manufacture and processing, the flash point of the compounds is also of significance, since both during production as well as during filling into the cable, relatively high temperatures may pertain for short periods. With the polyoxyalkylenes used, the flash points are higher than 220° C.

The advantageous properties of the filling materials according to the invention are demonstrated from the measured values listed in Table 7. The substances used are:

| POA | Polyoxypropylene PE 8901 |
|---|---|
| Silicic acid | TS 610 (Cabot) |
| Surfactant | Tracodis 200 |
| Anti-oxidation agent | Naftonox BHT |

The dynamic viscosity was determined with a Physica MC100 rheometer and a measuring system according to DIN 53109.

TABLE 7

Other Formulations

| Formulation | 1 | 2 | 3 | 4 | 5 | 6 |
|---|---|---|---|---|---|---|
| POA [% by weight] | 94.4 | 94.4 | 92.4 | 94.4 | 94.4 | 93.3 |
| Colloidal particles [% by weight] | 5.0 | 5.0 | 7.0 | 5.0 | 5.0 | 6.0 |
| Surfactant [% by weight] | 0.5 | 0.5 | 0.5 | — | — | 0.6 |
| Anti-oxidation agent [% by weight] | 0.1 | 0.1 | 0.1 | 0.1 | 0.1 | 0.1 |
| Mean mol weight of the basic oil [g/mol] | 1700 | 300 | 8000 | 1700 | 300 | 1700 |
| Dynamic viscosity of the basis oil at 25° C. [mPas] | 200 | 20 | 4000 | 200 | 20 | 200 |
| Cone penetration | | | | | | |
| +25° C. [mm/10] | 320 | 340 | 300 | 360 | 380 | 310 |
| −40° C. [mm/10] | 250 | 280 | 140 | 270 | 290 | 230 |
| Oil leaching [%] 60° C./24 h | 0.0 | 0.0 | 1.0 | 3.5 | 4.5 | 0.0 |
| Migration [%] 7 d/70° C. | <0.1 | <0.1 | <0.1 | <0.1 | <0.1 | <0.1 |

What is claimed is:

1. Filling material containing, related in each case to the total weight of the filling material:
(a) 50 to 99% by weight of one or more polyoxyalkylenes, of which the alkylene units comprise in each case 2 to 5 carbon atoms and in each case 2 to 4 ether bonds, wherein the polyoxyalkylenes have a molecular weight from 200 to 5000 g/mol,
(b) 1 to 10% by weight of one or more colloidal oxides and/or hydroxides of silicon and/or of aluminium, and
(c) 0.1 to 10% by weight of one or more surfactants, the surfactant being
(A) an anionic or cationic surfactant, and/or (B) a polyol, having at least 3 hydroxy groups, at least one of these hydroxy groups being etherised and/or esterised.

2. Filling material according to claim 1, characterised in that the filling material contains from 75 to 99% by weight, preferably 85 to 99% by weight (a).

3. Filling material according to claim 1, characterised in that the filling material contains from 2 to 6% by weight (b).

4. Filling material according to claim 1, characterised in that the filling material contains from 0.2 to 5% by weight (c).

5. Filling material according to claim 1, characterised in that (a) has a mean molecular weight from 200 to 2000.

6. Filling material according to claim 1, characterised in that (a) is polyoxypropylene and/or polyoxyethylene.

7. Filling material according to claim 1, additionally containing an anti-oxidation agent.

8. Filling material according to claim 1, additionally containing microspheres.

9. Filling material according to claim 1, characterised in that the surfactant according to (c)(A) is an alkyl ammonium salt.

10. Filling material according claim 1, characterised in that the surfactant according to (c)(B) is an ethoxylated polyolester.

11. Electrical or optical device with a sheath and/or housing, such as cables, strands, strips, plugs, or sleeves, containing at least one optical waveguide located in the interior of the device, wherein the sheath/housing is filled in the interior with a filling material according to claim 1.

12. Electrical or optical device according to claim 11, wherein the housing/sheath or its surface consists essentially of hydrocarbon polymers.

13. Use of the filling materials according to claim 1 in electrical or optical devices with a sheath/housing, such as cables, strands, strips, plugs, or sleeves, which contain at least one optical waveguide.

14. Use of the filling materials according to claim 13, characterised in that the surface of at least one of the devices, the filling material comes in contact with, consists essentially of hydrocarbon polymers.

* * * * *